(12) United States Patent
Herwat et al.

(10) Patent No.: US 10,767,543 B2
(45) Date of Patent: Sep. 8, 2020

(54) REDUCED LENGTH EXHAUST SYSTEM WITH VALVE

(71) Applicant: Tenneco Automotive Operating Company Inc., Lake Forest, IL (US)

(72) Inventors: Brett Herwat, Jackson, MI (US); Gabriel Ostromecki, Ann Arbor, MI (US); Jason Johnson, Brighton, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 58 days.

(21) Appl. No.: 16/040,975

(22) Filed: Jul. 20, 2018

(65) Prior Publication Data

US 2020/0025057 A1    Jan. 23, 2020

(51) Int. Cl.
| | |
|---|---|
| *F01N 13/08* | (2010.01) |
| *B60K 13/04* | (2006.01) |
| *F01N 13/04* | (2010.01) |
| *F01N 13/00* | (2010.01) |

(52) U.S. Cl.
CPC .............. *F01N 13/08* (2013.01); *B60K 13/04* (2013.01); *F01N 13/011* (2014.06); *F01N 13/04* (2013.01)

(58) Field of Classification Search
CPC ........ F01N 13/04; F01N 13/08; F01N 13/011; B60K 13/04
See application file for complete search history.

(56) References Cited

U.S. PATENT DOCUMENTS

| | | |
|---|---|---|
| 5,014,817 A | 5/1991 | Takato et al. |
| 5,321,214 A | 6/1994 | Uegane et al. |
| 5,325,666 A * | 7/1994 | Rutschmann ............ F01N 3/28 123/692 |
| 5,388,408 A | 2/1995 | Lawrence |
| 5,473,891 A | 12/1995 | Baxter et al. |
| 7,895,832 B2 | 3/2011 | Gruber |
| 7,942,235 B2 | 5/2011 | Mirlach et al. |
| 8,468,813 B2 | 6/2013 | Hill et al. |
| 9,109,482 B2 | 8/2015 | Fritz et al. |
| 9,261,009 B2 | 2/2016 | Hamashima et al. |

(Continued)

FOREIGN PATENT DOCUMENTS

| | | |
|---|---|---|
| DE | 4116493 A1 | 11/1992 |
| EP | 3118429 A1 | 1/2017 |
| KR | 20090063494 A | 6/2009 |

*Primary Examiner* — Bryan A Evans
(74) *Attorney, Agent, or Firm* — Harness, Dickey & Pierce, P.L.C.

(57) ABSTRACT

An exhaust system for receiving exhaust gas from an engine of a vehicle includes first, second, and third exhaust components, and first and second pipes. The first and second exhaust components are each adapted to receive exhaust gas from the engine. The first pipe has a first inlet, and first and second outlets. The first inlet is adapted to receive exhaust gas from the first exhaust component. The second pipe has a second inlet, and third and fourth outlets. The second inlet is adapted to receive exhaust gas from the second exhaust component. The third exhaust component is disposed downstream of and laterally between the first and second exhaust components. The third exhaust component has third and fourth inlets, and fifth and sixth outlets. The third inlet is fluidly connected to the first outlet. The fourth inlet is fluidly connected to the third outlet.

25 Claims, 5 Drawing Sheets

(56) References Cited

U.S. PATENT DOCUMENTS

| | | |
|---|---|---|
| 9,341,102 B2 | 5/2016 | Ross et al. |
| 9,453,452 B2 | 9/2016 | Kondo et al. |
| 9,464,557 B2 | 10/2016 | Hornby et al. |
| 9,605,580 B2 | 3/2017 | Drees et al. |
| 9,689,301 B2 | 6/2017 | Carr et al. |
| 2011/0000186 A1* | 1/2011 | Laube ................... F01N 1/00 60/272 |
| 2013/0008737 A1 | 1/2013 | Muller et al. |
| 2016/0024989 A1* | 1/2016 | Eichmueller ........... F01N 13/02 60/273 |
| 2018/0202344 A1* | 7/2018 | Klemenc ............... F01N 13/009 |
| 2018/0320646 A1 | 11/2018 | Naclerio |

* cited by examiner

REDUCED LENGTH EXHAUST SYSTEM WITH VALVE

FIELD

The present disclosure relates to an exhaust system for an internal combustion engine, and more particularly to a reduced length exhaust system having a valve.

BACKGROUND

This section provides background information related to the present disclosure which is not necessarily prior art.

An exhaust system for an internal combustion engine can include gasoline particulate filters (GPF), diesel particulate filters (DPF), diesel oxidation catalysts (DOC), lean NOx traps (LNT), selective catalytic reduction devices (SCR), and/or acoustic devices such as mufflers. Tradeoffs between packaging space, flow performance, and sound characteristics are often made in the design of an exhaust system. The present disclosure provides an exhaust system that fits within limited space on a vehicle while providing a desired level of performance and desired sound characteristics.

SUMMARY

This section provides a general summary of the disclosure, and is not a comprehensive disclosure of its full scope or all of its features.

In various aspects, the present disclosure provides an exhaust system for receiving exhaust gas from an engine of a vehicle. The exhaust system includes a first exhaust component, a second exhaust component, a first pipe, a second pipe, and a third exhaust component. The first exhaust component is adapted to receive exhaust gas from the engine. The second exhaust component is adapted to receive exhaust gas from the engine. The first pipe has a first inlet, a first outlet, and a second outlet. The first inlet is adapted to receive exhaust gas from the first exhaust component. The second pipe has a second inlet, a third outlet, and a fourth outlet. The second inlet is adapted to receive exhaust gas from the second exhaust component. The third exhaust component is disposed downstream of the first and second exhaust components. The third exhaust component has a third inlet, a fourth inlet, a fifth outlet, and a sixth outlet. The third inlet is fluidly connected to the first outlet. The fourth inlet is fluidly connected to the third outlet. The third exhaust component is disposed laterally between the first and second exhaust components such that the first exhaust component and the second exhaust component are each disposed outboard of the third exhaust component.

In other aspects, the present disclosure provides another exhaust system for receiving exhaust gas from an engine of a vehicle. The exhaust system includes a first exhaust component, a second exhaust component, a first pipe, a first valve, a second pipe, a second valve, and a third exhaust component. The first exhaust component is adapted to receive exhaust gas from the engine. The second exhaust component is adapted to receive exhaust gas from the engine. The first pipe has a first inlet, a first outlet, and a second outlet. The first inlet is adapted to receive exhaust gas from the first exhaust component. The first valve is disposed downstream of the first exhaust component. The first valve is adapted to receive exhaust gas from the second outlet and vary an amount of exhaust gas flowing therethrough. The second pipe has a second inlet, a third outlet, and a fourth outlet. The second inlet is adapted to receive exhaust gas from the second exhaust component. The second valve is disposed downstream of the second exhaust component. The second valve is adapted to receive exhaust gas from the fourth outlet and vary an amount of exhaust gas flowing therethrough. The third exhaust component is disposed downstream of the first and second exhaust components. The third exhaust component has a third inlet, a fourth inlet, a fifth outlet, and a sixth outlet. The third inlet is fluidly connected to the first outlet. The fourth inlet is fluidly connected to the third outlet.

In still other aspects, the present disclosure provides an exhaust system for receiving exhaust gas from an engine of a vehicle. The exhaust system includes a first exhaust component, a second exhaust component, a first pipe, a second pipe, a third exhaust component, a fourth exhaust component, a first E-valve, a fifth exhaust component, a second E-valve, a sixth exhaust component, and a seventh exhaust component. The first exhaust component is adapted to receive exhaust gas from the engine. The second exhaust component is adapted to receive exhaust gas from the engine. The first pipe has a first inlet, a first outlet, and a second outlet. The first inlet is adapted to receive exhaust gas from the first exhaust component. The first valve is disposed downstream of the first exhaust component. The first valve is adapted to receive exhaust gas from the second outlet and vary an amount of exhaust gas flowing therethrough. The second pipe has a second inlet, a third outlet, and a fourth outlet. The second inlet is adapted to receive exhaust gas from the second exhaust component. The second valve is disposed downstream of the second exhaust component. The second valve is adapted to receive exhaust gas from the fourth outlet and vary an amount of exhaust gas flowing therethrough. The third exhaust component is disposed downstream of the first and second exhaust components. The third exhaust component has a third inlet, a fourth inlet, a fifth outlet, and a sixth outlet. The third inlet is fluidly connected to the first outlet. The fourth inlet is fluidly connected to the first outlet.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 1:
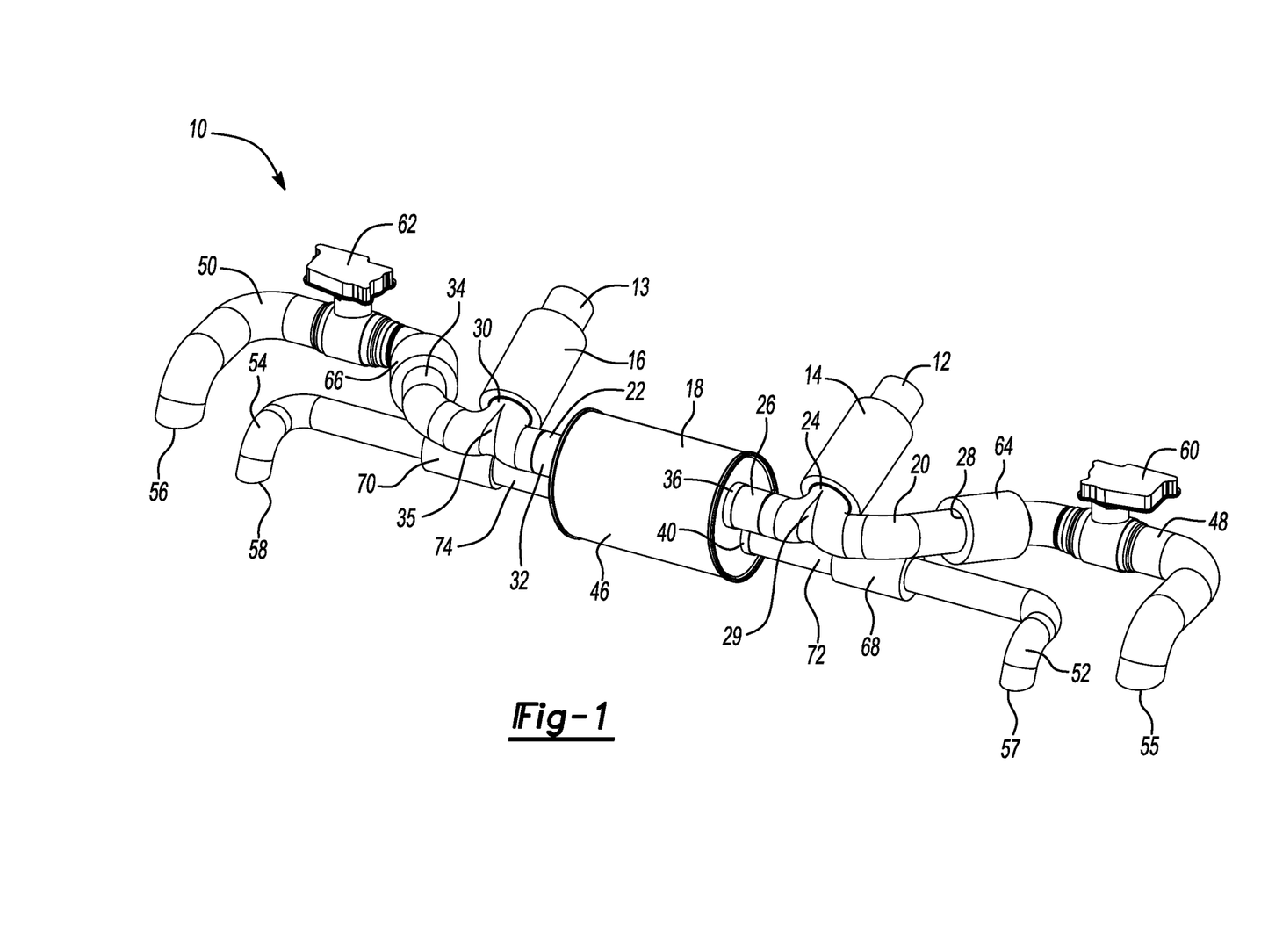
FIG. 1 is a perspective view of an exhaust assembly according to the principles of the present disclosure.
Figure 2:
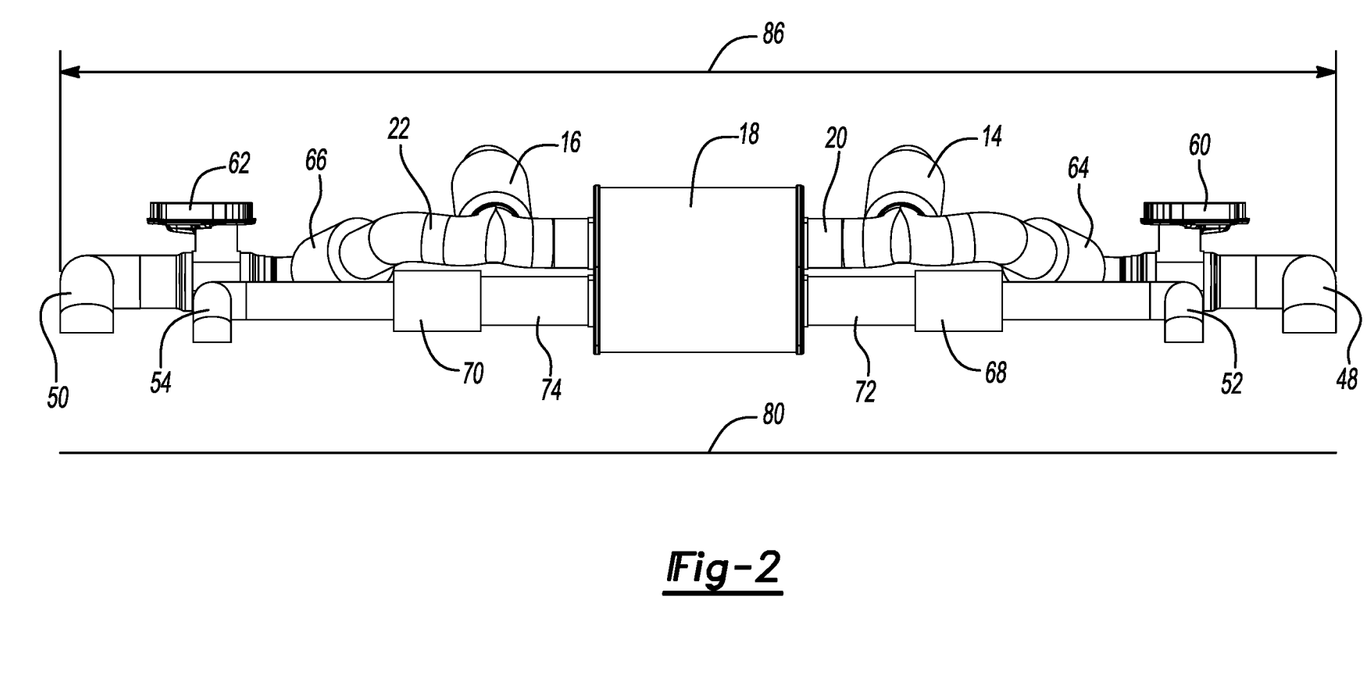
FIG. 2 is a rear view of the exhaust assembly of FIG. 1.
Figure 3:
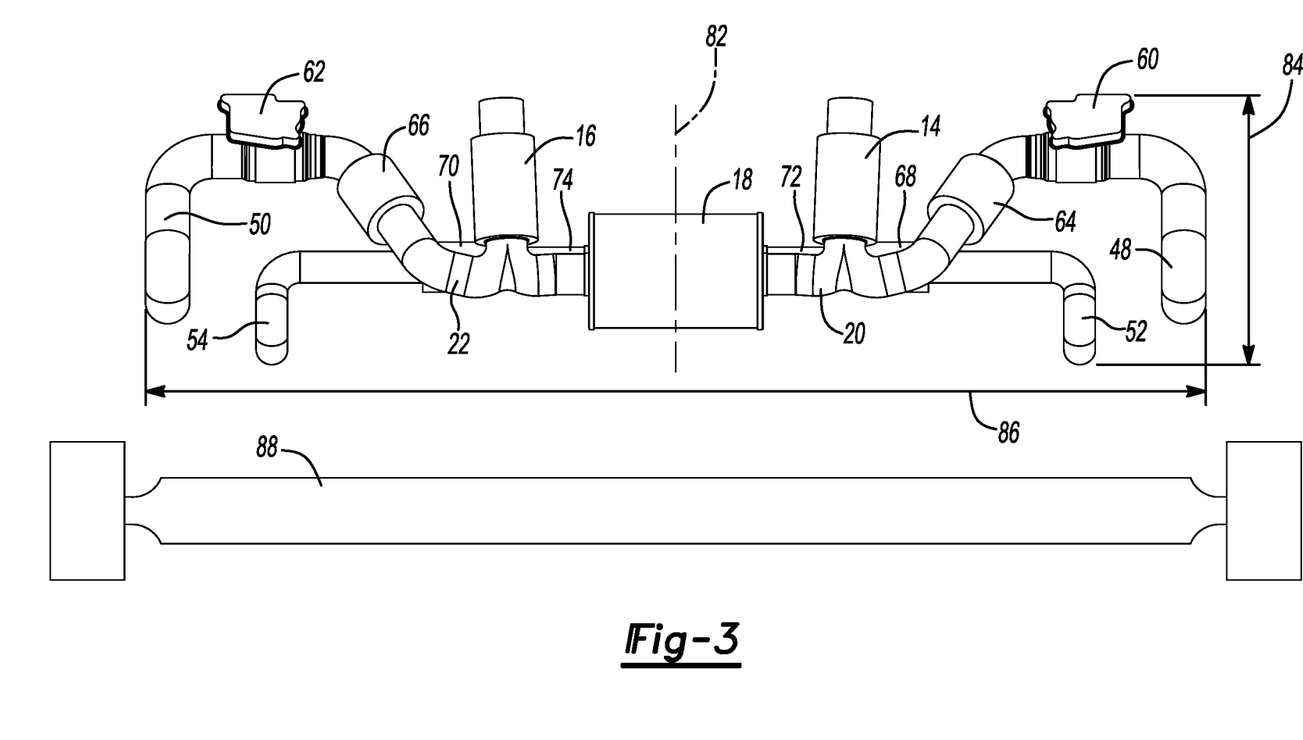
FIG. 3 is a top view of the exhaust assembly of FIG. 1.

With reference to FIGS. 1-3, an exemplary exhaust system or assembly 10 for an internal combustion engine (not shown) according to certain aspects of the present disclosure is provided. During operation of the engine, the exhaust assembly 10 may receive exhaust gas that is discharged from the engine. The exhaust gas may flow from the engine, through a first inlet pipe 12 and a second inlet pipe 13 that are configured in parallel. The first and second inlet pipes 12, 13 may be collectively referred to as a pair of inlet pipes 12, 13. The inlet pipes 12, 13 may be directly connected to the engine. In various aspects, the inlet pipes 12, 13 may be disposed near front wheels of the vehicle. The exhaust assembly 10 may be a dual-exhaust assembly. In various aspects, the pair of inlet pipes 12, 13 may receive exhaust gas from separate cylinder banks of the engine.

The exhaust assembly 10 may be shaped to fit within a given space available on a vehicle (not shown). For example, the exhaust assembly 10 may be shaped to fit around a spare tire well of the vehicle and/or other components at or near an undercarriage of the vehicle. The exhaust assembly 10 may include a first exhaust component 14, a second exhaust component 16, and a third exhaust component 18. The first, second, and third exhaust components 14, 16, 18 may be independently selected from the group consisting of: a gasoline particulate filter (GPF), a diesel particulate filter (DPF), a diesel oxidation catalyst (DOC), a lean NOx trap (LNT), a selective catalytic reduction device (SCR), and acoustic devices (e.g., a muffler, a resonator, a tuning component, a pinch can), and a valve (e.g., a hand valve, an E-valve).

Figure 4:
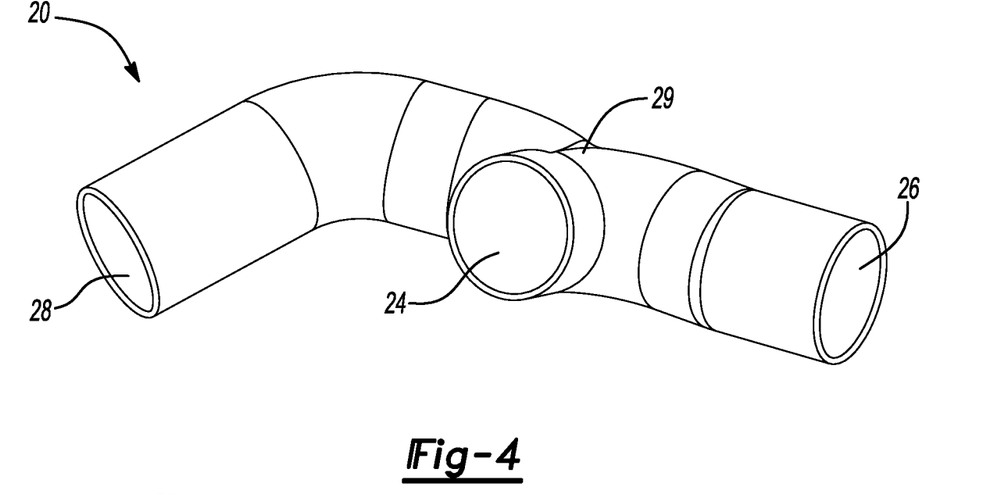
FIG. 4 is a perspective view of a first Y-pipe of the exhaust assembly of FIG. 1.
Figure 5:
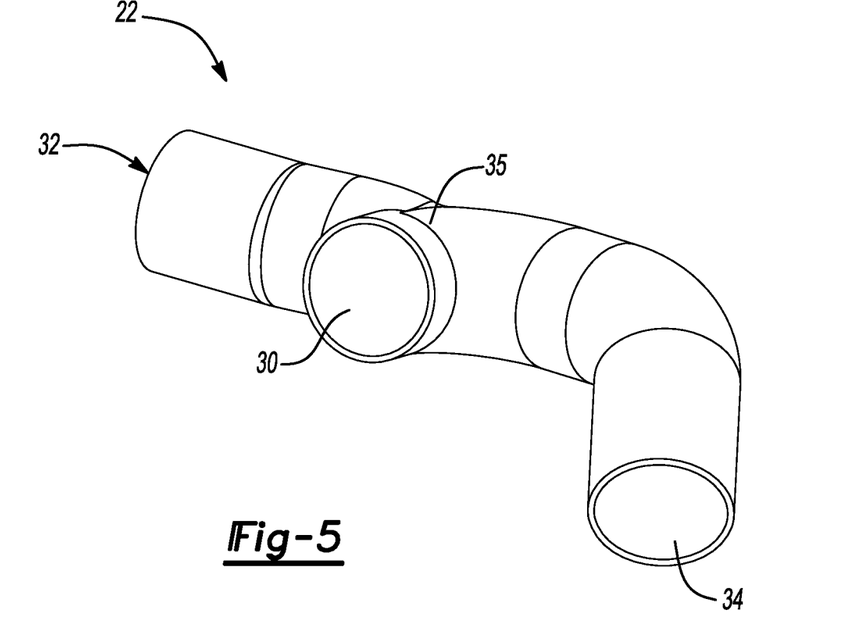
FIG. 5 is a perspective view of a second Y-pipe of the exhaust assembly of FIG. 2.

During operation of the engine, the first and second exhaust components 14, 16 may receive exhaust gas from the first and second inlet pipes 12, 13, respectively. The first and second exhaust components 14, 16 may discharge exhaust gas to first and second pipes 20, 22, respectively. With reference to FIG. 4, the first pipe 20 may include a first inlet 24, a first outlet 26, and a second outlet 28. Each of the first inlet 24 and the first and second outlets 26, 28 may be fluidly connected to one another. Exhaust flow may be split at a first junction 29. With reference to FIG. 5, the second pipe 22 may include a second inlet 30, a third outlet 32, and a fourth outlet 34. Each of the second inlet 30 and the third and fourth outlets 32, 34 may be fluidly connected to one another. Exhaust flow may be split at a second junction 35.

Returning to FIGS. 1-3, in various aspects, the first and second pipes 20, 22 are first and second Y-pipes, respectively. However, in other embodiments, the first and second pipes 20, 22 are other single-inlet, dual-outlet pipes, such as T-pipes or V-pipes. The first and second pipes 20, 22 may be identical. However, in alternative embodiments, the first pipe 20 has a different geometry than the second pipe 22. For example, the first and second pipes 20, 22 may have different diameters, longitudinal dimensions, curvature, and shapes.

Figure 6:
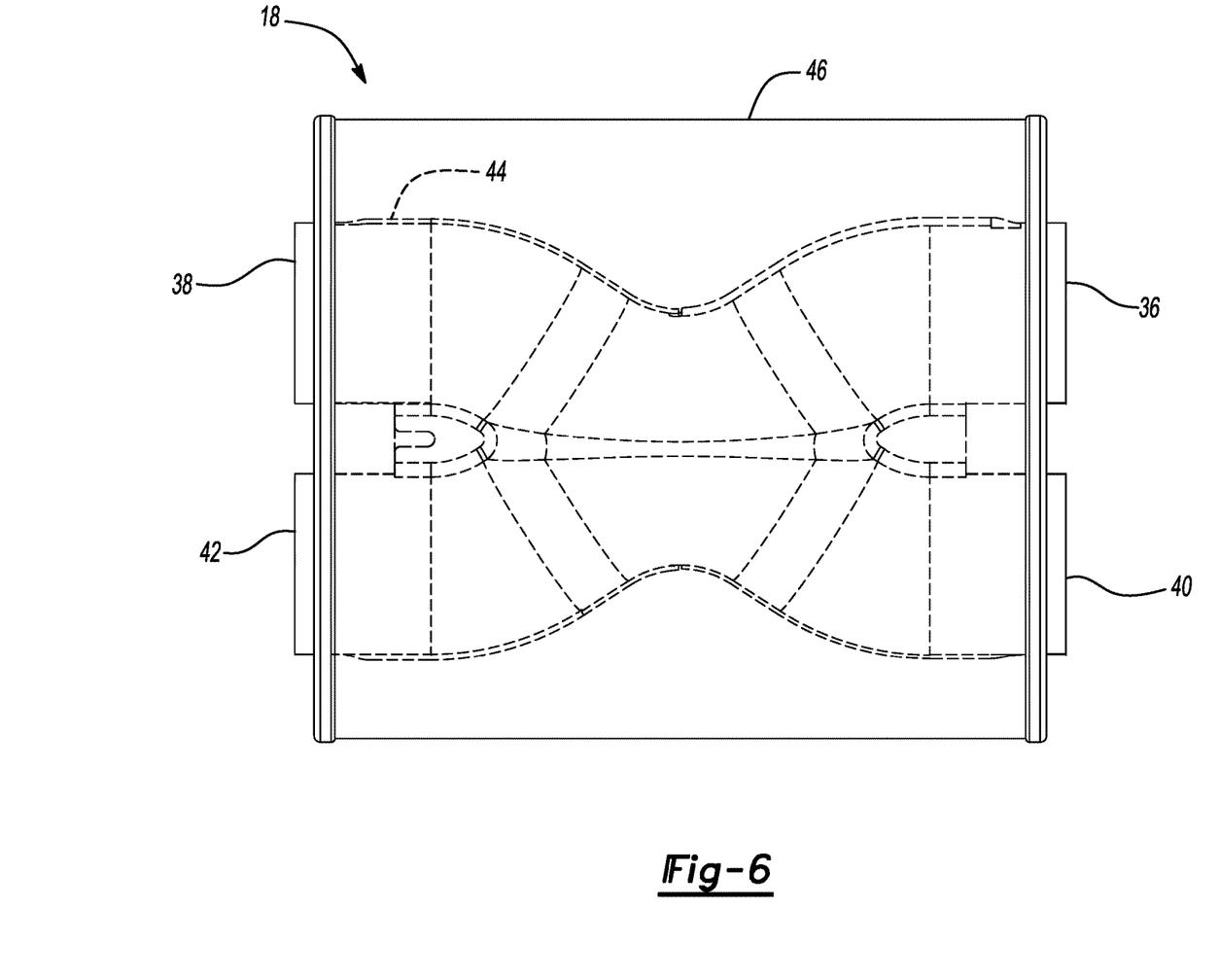
FIG. 6 is a rear view of a center exhaust component of the exhaust assembly of FIG. 1.

The third exhaust component 18 may be disposed downstream of the first and second exhaust components 14, 16. With reference to FIG. 6, the third exhaust component 18 may include a third inlet 36, a fourth inlet 38, a fifth outlet 40, and a sixth outlet 42. In various aspects, the third and fourth inlets 36, 38 and the fifth and sixth outlets 40, 42 may all be fluidly connected to one another. In one example, the third exhaust component 18 may include an X-pipe 44 that is at least partially disposed within a housing 46. The X-pipe 44 may therefore be disposed downstream of the first and second Y-pipes 20, 22. The X-pipe 44 may include the third and fourth inlets 36, 38 and the fifth and sixth outlets 40, 42. However, one skilled in the art will appreciate that other configurations having dual inlets and dual outlets are possible. In various aspects, the third exhaust component 18 is a muffler.

Returning to FIGS. 1-3, the third inlet 36 of the third exhaust component 18 may be fluidly connected to the first outlet 26 of the first pipe 20. The fourth inlet 38 of the third exhaust component 18 may be fluidly connected to the third outlet 32 of the second pipe 22. The third exhaust component 18 may be disposed laterally between the first and second exhaust components 14, 16. Therefore, the first and second exhaust components 14, 16 may be disposed laterally outboard of and on opposing sides of the third exhaust components 18. In various aspects, the third exhaust component 18 is referred to as the center exhaust component.

The exhaust assembly 10 may further include a third pipe 48, a fourth pipe 50, a fifth pipe 52, and a sixth pipe 54. The third pipe 48 may be disposed downstream of the first pipe 20 and fluidly connected to the second outlet 28 of the first pipe 20. During operation of the engine, exhaust gas may flow from the first exhaust component 14 into the first pipe 20, where it may be split into two streams. One stream may flow through the first outlet 26 into the third inlet 36 of the third exhaust component 18, and the other stream may flow through the second outlet 28 into the third pipe 48. The fourth pipe 50 may be disposed downstream of the second pipe 22 and fluidly connected to the fourth outlet 34 of the second pipe 22. During operation of the engine, exhaust gas may flow from the second exhaust component 16 into the second pipe 22, where it may be split into two streams. One stream may flow through the third outlet 32 into the fourth inlet 38 of the third exhaust component 18, and the other stream may flow through the fourth outlet 34 into the fourth pipe 50.

The fifth and sixth pipes 52, 54 may be disposed downstream of the third exhaust component 18. The fifth pipe 52 may be fluidly connected to the fifth outlet 40 of the third exhaust component 18. The sixth pipe 54 may be fluidly connected to the sixth outlet 42 of the third exhaust component 18. Therefore, during operation of the engine, the fifth and sixth pipes 52, 54 may each receive exhaust gas from the third exhaust component 18. In various aspects, the third, fourth, fifth, and sixth pipes 48, 50, 52, 54 are each tailpipes that are configured to discharge exhaust gas from the exhaust assembly 10 to the atmosphere during operation of the engine. More particularly, the third, fourth, fifth, and sixth pipes 48, 50, 52, 54 may include first, second, third, and fourth distal ends 55, 56, 57, 58, respectively, through which the exhaust gas passes to the atmosphere. Distal ends 55, 56, 57, 58 may be oriented in alternate positions as desired (not shown).

The exhaust assembly 10 may further include a first valve 60 and a second valve 62. The first and second valves 60, 62 may be first and second electronic valves ("E-valves"). The first valve 60 may be disposed downstream of the first exhaust component 14. The first valve 60 may be fluidly connected to the second outlet 28 of the first pipe 20. The second valve 62 may be disposed downstream of the second exhaust component 16. The second valve 62 may be fluidly connected to the fourth outlet 34 of the second pipe 22. The first and second valves 60, 62 may vary the amount of exhaust gas flowing therethrough during operation of the engine, as discussed in greater detail below. In various aspects, the exhaust assembly 10 further includes a first pressure sensor (not shown) that is disposed upstream of the first valve 60 and a second pressure sensor (not shown) that is disposed upstream of the second valve 62. Input from the first pressure sensor may be used to detect failure of a position of the first valve 60. Input from the second pressure sensor may be used to detect failure of a position of the second valve 62. In various aspects, the first valve 60 is disposed on the third pipe 48 and the second valve 62 is disposed on the fourth pipe 50.

The exhaust assembly may further include a fourth exhaust component 64, a fifth exhaust component 66, a sixth exhaust component 68, and a seventh exhaust component 70. The fourth, fifth, sixth, and seventh exhaust components 64, 66, 68, 70 may be acoustic components. Acoustic components can include mufflers, resonators, tuning components, and pinch cans, by way of example. In various aspects, the fourth, fifth, sixth, and seventh exhaust components 64, 66, 68, 70 are acoustic components that are capable of attenuating high-frequency noise.

The fourth exhaust component 64 may be disposed downstream of the first exhaust component 14 and fluidly connected to the second outlet 28 of the first pipe 20. The fourth exhaust component 64 and the first valve 60 may be connected in series. The fourth exhaust component 64 may be disposed between the first pipe 20 and the third pipe 48. In various aspects, the first valve 60 is disposed downstream of the fourth exhaust component 64. Thus, during operation of the engine, exhaust gas may flow from the second outlet 28 of the first pipe 20 through the fourth exhaust component 64 and into the third pipe 48 where it passes through the first valve 60 and is discharged to the atmosphere.

The fifth exhaust component 66 may be disposed downstream of the second exhaust component 16 and fluidly connected to the fourth outlet 34 of the second pipe 22. The fifth exhaust component 66 and the second valve 62 may be connected in series. The fifth exhaust component 66 may be disposed between the second pipe 22 and the fourth pipe 50. In various aspects, the second valve 62 is disposed downstream of the fifth exhaust component 66. Thus, during operation of the engine, exhaust gas may flow from the fourth outlet 34 of the second pipe 22 through the fifth exhaust component 66 and into the fourth pipe 50 where it passes through the second valve 62 and is discharged to the atmosphere. In various alternative aspects, the fourth and fifth exhaust components 64, 66 may be disposed downstream of the first and second valves 60, 62, respectively.

The sixth and seventh exhaust components 68, 70 may be disposed downstream of the third exhaust component 16. The sixth exhaust component 68 may be fluidly connected to the fifth outlet 40 of the third exhaust component 18. The seventh exhaust component 70 may be fluidly connected to the sixth outlet 42 of the third exhaust component 18.

The exhaust assembly 10 may further include seventh and eighth pipes 72, 74. The seventh pipe 72 may be fluidly connected to the fifth outlet 40 of the third exhaust component 18. The sixth exhaust component 68 may be disposed downstream of the seventh pipe 72. The fifth pipe 52 may be disposed downstream of the sixth exhaust component 68. During operation of the engine, exhaust gas may flow from the fifth outlet 40 of the third exhaust component 18, through the seventh pipe 72, through the sixth exhaust component 68, and into the fifth pipe 52, from which it is discharged to the atmosphere. The eighth pipe 74 may be fluidly connected to the sixth outlet 42 of the third exhaust component 18. The seventh exhaust component 70 may be disposed downstream of the eighth pipe 74. The sixth pipe 54 may be disposed downstream of the seventh exhaust component 70. During operation of the engine, exhaust gas may flow from the sixth outlet 42 of the third exhaust component 18, through the eighth pipe 74, through the seventh exhaust component 70, and into the sixth pipe 54, from which it is discharged to the atmosphere.

In various aspects, the fourth and fifth exhaust components 64, 66 may be omitted from the exhaust assembly 10. In various aspects, the sixth and seventh exhaust components 68, 70 may be omitted from the exhaust assembly 10. When the fourth and fifth exhaust components 64, 66 are omitted from the exhaust system, the sixth and seventh exhaust components 68, 70 may alternatively be referred to as fourth and fifth exhaust components.

The first and second valves 60, 62 may be actuated to regulate flow of exhaust gas through the exhaust assembly 10. The valves 60, 62 can be actuated to change the sound characteristics of the exhaust assembly 10 during operation of the engine. Each valve 60, 62 may be moved from a first or fully open position to a second or fully closed position. In the fully open position, back flow in the exhaust assembly 10 is reduced or eliminated. In the fully closed position, sound attenuation is increased to reduce pass-by noise. The valves 60, 62 may be actuated concurrently or independently. In a first configuration, the valves 60, 62 are both in the fully-open state. In a second configuration, the valves 60, 62 are both in the fully-closed state. In a third configuration, the first valve 60 is in the fully-open state and the second valve 62 is in the fully-closed state. In a fourth configuration, the second valve 62 is in the fully-open state and the first valve 60 is in the fully-closed state.

In the first configuration, exhaust gas may be discharged from the engine and into the first and second inlet pipes 12, 13. The exhaust gas may flow through the first and second exhaust components 14, 16 and into the first and second pipes 20, 22 respectively. In the first and second pipes 20, 22, each exhaust gas stream may be split so that a portion flows into the third exhaust component 18 and other portions flow through the fourth and fifth exhaust components 64, 66 and the fourth and fifth pipes 50, 52, respectively. Exhaust gas that flows into the third exhaust component 18 from the first and second pipes 20, 22 may be mixed and may flow into the seventh and eighth pipes 72, 74. From the seventh and eighth pipes 74, 76, exhaust gas may flow through the sixth and seventh exhaust components 68, 70 and the fifth and sixth pipes 52, 54, respectively.

In the second configuration, exhaust gas may be discharged from the engine and into the first and second inlet pipes 12, 13. The exhaust gas may flow through the first and second exhaust components 14, 16 and into the first and second pipes 20, 22, respectively. The exhaust gas may flow into the third exhaust component 18 from the first and second pipes 20, 22, in which it is mixed. Portions of the exhaust gas may flow into the fourth and fifth exhaust components 64, 66, and ultimately be diverted into the third exhaust component 18.

One skilled in the art will appreciate that the exhaust assembly 10 may include additional components. For example, the exhaust assembly 10 may include additional valves on one or more of the first inlet pipe 12, the second inlet pipe 13, the fifth pipe 52, and the sixth pipe 54. In another example, the exhaust assembly 10 may include one or more resonators, such as on the X-pipe 44 within the third exhaust component 18. Exhaust gas from the third exhaust component 18 may be directed into the seventh and eighth pipes 72, 74. From the seventh and eighth pipes 72, 74, exhaust gas may flow through the sixth and seventh exhaust components 68, 70 and the fifth and sixth pipes 52, 54, respectively.

The exhaust assembly 10 for the engine may be disposed on a vehicle (not shown) that is adapted to travel along a surface 80 (FIG. 2). The vehicle may include a longitudinal axis 82 (FIG. 3). The longitudinal axis 82 may extend between a front of the vehicle and a rear of the vehicle. In various aspects, the exhaust assembly may be symmetric about a plane extending parallel to the longitudinal axis 82 and perpendicular to the ground 80. The longitudinal axis 82 may extend through the center exhaust component 18.

The exhaust assembly 10 may have a length 84 (FIG. 3) parallel to the longitudinal axis 82. The exhaust assembly 10 may have a width 86 (FIGS. 2-3) perpendicular to the length 84 and parallel to the surface 80. The exhaust assembly 10 mat extend laterally between a first side (e.g., passenger) of the vehicle and a second side (e.g., driver side) of the vehicle. The width 86 may be defined in the lateral direction. The length 84 may be less than the width 86. In various aspects, a ratio of the length 84 to the width 86 is less than or equal to 0.5, optionally less than or equal to 0.45, optionally less than or equal to 0.4, optionally less than or equal to 0.35, optionally less than or equal to 0.3, optionally less than or equal to 0.25, optionally less than or equal to 0.2, and optionally less than or equal to 0.15. In various aspects, the pipes 20, 22, 48, 50, 52, 54, 72, 74 may include one or more bends to accommodate packaging requirements for the exhaust assembly 10.

FIGS. 2-3 shows a rear of the exhaust assembly 10 as it could be oriented on the vehicle. In various aspects, the first, second, and third exhaust components 14, 16, 18 may each be disposed completely forward of a rear axle 88 of the vehicle. The third, fourth, fifth, and sixth pipes 48, 50, 52, 54 may each be disposed forward of the rear axle 88 of the vehicle. In various aspects, the third, fourth, fifth, and sixth pipes 48, 50, 52, 54 are tailpipes that are located adjacent to a front axle of the vehicle. The vehicle may be a hybrid vehicle that uses two or more distinct types of power to drive the vehicle (e.g., the internal combustion engine and an electric motor). The entire exhaust system may be disposed parallel to a firewall of the vehicle. In various aspects, the third, fourth, fifth, and sixth pipes 48, 50, 52, 54 are each disposed forward of the front axle. However, in alternative aspects, the entire exhaust assembly 10 may be disposed adjacent to the rear axle 88 of the vehicle.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An exhaust system for receiving exhaust gas from an engine of a vehicle, the exhaust system comprising:
    a first exhaust treatment component including an inlet adapted to receive exhaust gas from the engine and an outlet;
    a second exhaust treatment component including an inlet adapted to receive exhaust gas from the engine and an outlet;
    a first pipe having a first inlet adapted to receive exhaust gas from the outlet of the first exhaust treatment component, a first outlet, and a second outlet;

a second pipe having a second inlet adapted to receive exhaust gas from the outlet of the second exhaust treatment component, a third outlet, and a fourth outlet; and a third exhaust component that is disposed downstream of the first and second exhaust treatment components, the third exhaust component having a third inlet that is fluidly connected to the first outlet, a fourth inlet that is fluidly connected to the third outlet, a fifth outlet, and a sixth outlet, the third exhaust component being disposed laterally between the first and second exhaust treatment components such that the first exhaust treatment component and the second exhaust treatment component are each disposed outboard of the third exhaust component.

2. The exhaust system of claim 1, wherein the first pipe is a first Y-pipe and the second pipe is a second Y-pipe.

3. The exhaust system of claim 1, wherein the third inlet, the fourth inlet, the fifth outlet, and the sixth outlet of the third exhaust component are fluidly connected to one another.

4. The exhaust component of claim 3, wherein the third exhaust component further includes a housing having an X-pipe at least partially disposed therein, the X-pipe including the third inlet, the fourth inlet, the fifth outlet, and the sixth outlet.

5. The exhaust system of claim 3, wherein the third exhaust component is a muffler.

6. The exhaust system of claim 1, further comprising:
a first valve disposed downstream of the first exhaust treatment component and adapted to receive exhaust gas from the second outlet and vary an amount of exhaust gas flowing therethrough; and
a second valve disposed downstream of the second exhaust treatment component and adapted to receive exhaust gas from the fourth outlet and vary an amount of exhaust gas flowing therethrough.

7. The exhaust system of claim 6, wherein the first valve is a first E-valve and the second valve is a second E-valve.

8. The exhaust system of claim 1, further comprising:
a fourth exhaust component disposed downstream of the first exhaust treatment component and adapted to receive exhaust gas from the second outlet; and
a fifth exhaust component disposed downstream of the second exhaust treatment component and adapted to receive exhaust gas from the fourth outlet.

9. The exhaust system of claim 8, wherein the fourth and fifth exhaust components are acoustic components.

10. The exhaust system of claim 1, further comprising:
a fourth exhaust component disposed downstream of the third exhaust component and adapted to receive exhaust gas from the fifth outlet; and
a fifth exhaust component disposed downstream of the third exhaust component and adapted to receive exhaust gas from the sixth outlet.

11. The exhaust system of claim 10, wherein the fourth and fifth exhaust components are acoustic components.

12. The exhaust system of claim 1, wherein:
the vehicle extends along a longitudinal axis and the exhaust system defines a length parallel to the longitudinal axis;
the exhaust system defines a width perpendicular to the length; and
a ratio of the length to the width is less than or equal to 0.5.

13. The exhaust system of claim 12, wherein the ratio is less than or equal to 0.4.

14. The exhaust system of claim 1, wherein each of the first, second, and third exhaust components is disposed completely forward of a rear axle of the vehicle.

15. The exhaust system of claim 1, further comprising:
a third pipe disposed downstream of the first pipe and fluidly connected to the second outlet;
a fourth pipe disposed downstream of the second pipe and fluidly connected to the fourth outlet;
a fifth pipe disposed downstream of the third exhaust component and fluidly connected to the fifth outlet; and
a sixth pipe disposed downstream of the third exhaust component and fluidly connected to the sixth outlet.

16. The exhaust system of claim 15, wherein:
the third, fourth, fifth, and sixth pipes are tailpipes that are configured to discharge exhaust gas from the exhaust system to the atmosphere; and
the third, fourth, fifth, and sixth pipes are disposed completely forward of a rear axle of the vehicle.

17. An exhaust system for receiving exhaust gas from an engine of a vehicle, the exhaust system comprising:
a first exhaust treatment component adapted to receive exhaust gas from the engine;
a second exhaust treatment component adapted to receive exhaust gas from the engine;
a first pipe having a first inlet adapted to receive exhaust gas from the first exhaust treatment component, a first outlet, and a second outlet;
a first valve disposed downstream of the first exhaust treatment component and adapted to receive exhaust gas from the second outlet and vary an amount of exhaust gas flowing therethrough;
a second pipe having a second inlet adapted to receive exhaust gas from the second exhaust treatment component, a third outlet, and a fourth outlet;
a second valve disposed downstream of the second exhaust treatment component and adapted to receive exhaust gas from the fourth outlet and vary an amount of exhaust gas flowing therethrough; and
a third exhaust component disposed downstream of the first and second exhaust treatment components, the third exhaust component having a third inlet that is fluidly connected to the first outlet, a fourth inlet that is fluidly connected to the third outlet, a fifth outlet, and a sixth outlet.

18. The exhaust system of claim 17, wherein the first valve is a first E-valve and the second valve is a second E-valve.

19. The exhaust system of claim 18, wherein the first and second valves are adapted to one of:
both be in a fully-open state; and
both be in a fully-closed state.

20. The exhaust system of claim 19, wherein:
one of the first valve and the second valve is adapted to be in a fully-open state; and
the other of the first valve and the second valve is adapted to be in a fully-closed state.

21. The exhaust system of claim 17, further comprising:
a fourth exhaust component disposed downstream of the first exhaust treatment component and adapted to receive exhaust gas from the second outlet, the fourth exhaust component and the first valve being connected in series; and
a fifth exhaust component disposed downstream of the second exhaust treatment component and adapted to receive exhaust gas from the fourth outlet, the fifth exhaust component and the second valve being connected in series.

22. The exhaust system of claim 21, wherein:
the first valve is disposed downstream of the fourth exhaust component; and
the second valve is disposed downstream of the fifth exhaust component.

23. The exhaust system of claim 17, further comprising:
a fourth exhaust component disposed downstream of the third exhaust component and adapted to receive exhaust gas from the fifth outlet; and
a fifth exhaust component disposed downstream of the third exhaust component and adapted to receive exhaust gas from the sixth outlet.

24. The exhaust system of claim 17, wherein the third exhaust component is a muffler and the third inlet, fourth inlet, fifth outlet, and sixth outlet are fluidly connected to one another.

25. An exhaust system for receiving exhaust gas from an engine of a vehicle, the exhaust system comprising:
a first exhaust treatment component adapted to receive exhaust gas from the engine;
a second exhaust treatment component adapted to receive exhaust gas from the engine;
a first pipe having a first inlet adapted to receive exhaust gas from the first exhaust treatment component, a first outlet, and a second outlet;
a second pipe having a second inlet adapted to receive exhaust gas from the second exhaust treatment component, a third outlet, and a fourth outlet;
a third exhaust component that is disposed downstream of the first and second exhaust treatment components, the third exhaust component having a third inlet that is fluidly connected to the first outlet, a fourth inlet that is fluidly connected to the third outlet, a fifth outlet, and a sixth outlet;
a fourth exhaust component disposed downstream of the first exhaust component and adapted to receive exhaust gas from the second outlet;
a first E-valve fluidly connected to the first exhaust treatment component and disposed downstream of the fourth exhaust component, the first E-valve being adapted to vary an amount of exhaust gas flowing therethrough;
a fifth exhaust component disposed downstream of the second exhaust treatment component and adapted to receive exhaust gas from the fourth outlet;
a second E-valve fluidly connected to the second exhaust treatment component and disposed downstream of the fifth exhaust component, the second E-valve being adapted to vary an amount of exhaust gas flowing therethrough;
a sixth exhaust component disposed downstream of the third exhaust component and adapted to receive exhaust gas from the fifth outlet; and
a seventh exhaust component disposed downstream of the third exhaust component and adapted to receive exhaust gas from the sixth outlet.

* * * * *